US009477254B2

(12) United States Patent
Retsch

(10) Patent No.: US 9,477,254 B2
(45) Date of Patent: Oct. 25, 2016

(54) SHIFT ERROR SAFEGUARD FOR A TRANSMISSION IN A MOTOR-VEHICLE

(71) Applicant: ZF Friedrichshafen AG, Friedrichshafen (DE)

(72) Inventor: Matthias Retsch, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 493 days.

(21) Appl. No.: 13/762,561

(22) Filed: Feb. 8, 2013

(65) Prior Publication Data
US 2013/0220054 A1 Aug. 29, 2013

(30) Foreign Application Priority Data

Feb. 27, 2012 (DE) .................. 10 2012 202 890

(51) Int. Cl.
*G05G 5/02* (2006.01)
*F16H 63/34* (2006.01)
*F16H 63/36* (2006.01)
*F16H 63/30* (2006.01)

(52) U.S. Cl.
CPC ............... *G05G 5/02* (2013.01); *F16H 63/34* (2013.01); *F16H 63/36* (2013.01); *F16H 2063/3076* (2013.01); *Y10T 74/20128* (2015.01)

(58) Field of Classification Search
CPC ................. F16H 2061/185; F16H 2063/3083; F16H 61/18
USPC .............. 74/473.22, 473.24–473.26, 473.28, 74/473.3, 473.33, 473.36
See application file for complete search history.

(56) References Cited

U.S. PATENT DOCUMENTS

| 2,242,027 A | * | 5/1941 | Fishburn ................. 74/473.28 |
| 3,933,057 A | * | 1/1976 | Tsuzuki et al. ............ 74/473.22 |
| 3,937,100 A | * | 2/1976 | Huffman et al. .......... 74/473.21 |
| 4,584,895 A | * | 4/1986 | Holmes ..................... 74/473.26 |
| 4,638,678 A | * | 1/1987 | Gorman et al. ........... 74/473.22 |

(Continued)

FOREIGN PATENT DOCUMENTS

| DE | 10 2009 024 821 A1 | 12/2010 |
| DE | 10 2009 027 533 A1 | 1/2011 |

(Continued)

OTHER PUBLICATIONS

German Search Report Corresponding to DE 10 2012 202 890.0.

*Primary Examiner* — David M Fenstermacher
(74) *Attorney, Agent, or Firm* — Davis & Bujold, PLLC; Michael J. Bujold

(57) ABSTRACT

A shift safety device for a manual transmission having a gear shift shaft that rotates to select shift gates and moves to shift gears. The device has a blocking element which, during selector motion towards a shift gate, is driven by the gear shift shaft, against a spring, from a starting position into a blocked position, in which the device blocks further selector motion of the gearshift shaft, and which, during subsequent shifting motion of the gearshift shaft, is released and returned back to the starting position, by the spring, thereby permitting further selector motion. A driver arm, disposed on the gear shift shaft, moves the blocking element tangential to the arc traversed during selector motion by the driver arm between the starting and blocking positions. The blocking element moves in the linear track traversed during shifting of the driver arm and is pretensioned toward the starting and center positions.

11 Claims, 7 Drawing Sheets

(56) References Cited

U.S. PATENT DOCUMENTS

2010/0294069 A1* 11/2010 Ore .......................... 74/473.28
2012/0096972 A1   4/2012 Retsch

FOREIGN PATENT DOCUMENTS

| JP | 6-74336 A | 3/1994 |
|----|-----------|--------|
| JP | 2012-26540 A | 2/2012 |

* cited by examiner

SHIFT ERROR SAFEGUARD FOR A TRANSMISSION IN A MOTOR-VEHICLE

This application claims priority from German patent application serial no. 10 2012 202 890.0 filed Feb. 27, 2012.

FIELD OF THE INVENTION

The invention relates to a shift safety device for a manual motor vehicle transmission.

BACKGROUND OF THE INVENTION

For manually shiftable motor vehicle transmissions in particular, H or multiple H shift patterns having multiple shift gates and a selection gate connecting the shift gates are used for a manual shift lever to be actuated by the driver, by means of which the driver can manually select the shift gate, and can engage and disengage one of the gear steps assigned to the selected shift gate. The movement of the manual shift lever for selecting a shift gate and for shifting a gear step is transferred to a rotatable and axially movable gear shift shaft internal to the transmission, wherein the selector motion can be assigned to the axial displacement and the shifting motion can be assigned to the rotation of the gear shift shaft, or vice versa.

Known manual transmissions for motor vehicles typically have five or six forward gears distributed among three shift gates and one reverse gear assigned where applicable to a special shift gate, wherein the delineation of the shift gates to each other is relatively uncritical and incorrect shifting is correspondingly unlikely. Shift patterns of such manual transmissions are shown in the FIGS. 1 and 2.

The shift pattern of a five speed transmission according to FIG. 1 has three shift gates 2, 4, 6, and a selector gate 8 connecting the shift gates. The first and second gear G1 and G2 are assigned to the outer, first shift gate 2. The third and fourth gear G3 and G4 are assigned to the center, second shift gate 4, in which the manual shift lever 10 is automatically centered in a neutral position by spring means. The fifth gear G5 and the reverse gear R are assigned to the outer, third shift gate 6. The two outer shift gates 2 and 6 can be easily located from the center neutral shift gate by the driver without danger of incorrect shifting. In order to prevent an inadvertent engagement of the reverse gear R, with a shifting device according to FIG. 1, a shift interlock is typically provided that can be designed as a push lock, a push-down lock or as a pull ring lock.

The known shifting pattern according to FIG. 2, comprises four shift gates 12, 14, 16, 18 and the selector gate 20 connecting the shift gates. The first, outer shift gate 14 and the center shift gate 16 are assigned to the gears G1, G2 or G3, G4 as in the example of FIG. 1. In this case, the gears G5 and G6 are assigned to the third, outer shift gate 18, whereas the reverse gear R is assigned to its own shift gate 12, lying further outside with respect to the shift gate 14. Accidental engagement of the reverse gear R with a shift device according to FIG. 2 can be prevented by a shift interlock of the type described above, and also by a selector interlock, by means of which, starting from the first shift gate 14, selecting the adjacent shift gate 12 for the reverse gear R is made difficult due to an increased selection force, or is prevented by a releasable form-locking lock. Such shift and selector interlocks typically interact with the manual shift lever 22 in a shift device external to the transmission, so that the device does not require any constructive intervention in the transmission.

Due to the demands for increasingly lower motor vehicle fuel consumption, an increased number of gears is desired for the transmission because a reduction in the transmission ratio steps between the gears enables nearly constant operation of the respective internal combustion engine in a rotational speed range with a specific low fuel consumption. This inevitably results in a greater number of shift gates compared to the described shift pattern. FIG. 3 shows a shift pattern having seven or eight forward gears and one reverse gear. As seen with respect to the arrangement shown in FIG. 2, an additional shift gate 24 is disposed outside of the third shift gate 18 and to which the seventh gear G7 and, if necessary, an eighth gear G8 are assigned. With a shift pattern according to FIG. 3, during an upshift procedure from a third gear G3 or a fourth gear G4 of the second shift gate 16 there is the danger of inadvertently skipping the immediately adjacent shift gate 18 for the fifth and sixth gear G5, G6, and as a result a seventh or eighth gear G7 or G8 of the fourth shift gate 24 is erroneously engaged. This shifting error leads to a loss of tractive power and in most operating situations requires an immediate corrective shift into a lower gear G5, G6.

Whereas the delimitation of the reverse gear R, or the shift gate 12 of the reverse gear R, by a shift or selector interlock of the type described above is accepted, such a delimitation of the outer shift gate 24 allocated to the forward gears G7, G8 is judged to be unacceptable due to the associated shift delay.

A shift safety device of the type named in the preamble of claim 1 is already known from document DE 10 2009 027 533 A1 in which a next outer shift gate, adjacent to the third shift gate, can be selected only after a gear in this third shift gate has been engaged. This known shift safety device is designed for a manual transmission having a gear shift shaft, the rotation of which results in a shift procedure and the axial displacement of which results in a selection procedure. This known shift safety device comprises a blocking element integrated directly in the gear shift shaft arrangement in a manner that is constructively complex and difficult to manufacture, wherein the actual gear shift shaft is disposed directly on a central guide shaft, and the blocking element designed as a blocking ring is disposed indirectly via a bearing sleeve on a central guide shaft, and wherein this blocking ring and the end of the gear shift shaft facing the blocking ring are each provided with interacting cam-like contact contours.

SUMMARY OF THE INVENTION

The problem addressed by the invention is to create a shift safety device that is constructively simpler and easier to manufacture in comparison to the known arrangement. This shift safety device is to be usable for gear shift shafts whose rotation causes a selector procedure and whose axial displacement causes a shift procedure in the manual transmission.

The invention is based, therefore, on a shift safety device for a motor vehicle manual transmission having a gear shift shaft that can be rotated for selecting shift gates and can be moved axially for shifting gear steps, comprising a blocking element which, during selector motion towards an adjacent shift gate, is taken along by the gear shift shaft using a cam-like contact contour against the force of a reset spring out of a starting position into a blocked position, in which it blocks a further selector motion of the gearshift shaft, and which during a subsequent shifting motion of the gearshift shaft is released again and returned by the return spring into the starting position thereof, permitting a further selector motion.

Additionally this shift safety device is designed so that a radially projecting driver arm is disposed on the gear shift shaft, that the free end of the driver arm and the blocking element each have contact contours interacting with each other, that during a selector motion the blocking element is disposed in a surrounding structure of the gearshift shaft that is fixed to the housing and substantially tangential to the arc track traversed by the free end of the driver arm and is movable between the starting position thereof and the blocking position thereof, that the blocking element is supported, movable substantially parallel to the longitudinal axis of the gearshift shaft in the direction of the linear track traversed by the free end of the driver arm during a shifting motion, and that the blocking element is disposed pretensioned to the starting position thereof by a reset spring arrangement and along the linear track by centering spring means to a center position.

This design allows the gearshift shaft itself to be extremely simple to construct because the rotational and longitudinal motion thereof is transferred, using the driver arm, outward onto the blocking element that is substantially constructively independent of the actual gear shift shaft, and the blocking element takes on the above described task of blocking the additional shift gate that is not directly adjacent to the neutral shift gate. The neutral shift gate is the shift gate into which the shift lever is automatically centered by the manual shift device.

According to one design of the invention, the blocking element is disposed in its own supporting housing and mounted there, movable between the starting position thereof and the blocking position thereof. The supporting housing for its part is mounted axially moveable in the surrounding structure, for example a housing.

As described in detail based on an example embodiment, the cam-like or tooth-shaped contact contour causes the blocking element to be carried along during the selector motion into the blocking position thereof, and then, with a subsequent selector motion, to be released again such that the blocking element jumps back into its starting position. The contact contour can, in principle, have any shape and be assigned either to the blocking element or to the free end of the driver arm, or both.

Another embodiment of the invention provides that the supporting housing for the blocking element has the shape of a cylinder with a longitudinal axis parallel to the gear shift shaft, that the cylindrical supporting housing has a radial recess for moveably accommodating the blocking element shaped substantially as a plate, that the return spring arrangement is disposed between the blocking element and the bottom of the recess, that a guiding rod is disposed at each of the two face sides of the cylindrical supporting housing and is moveably disposed in an assigned bearing mounting, and that in each case a compression spring of the centering spring means loading the supporting housing toward the center position thereof is disposed between a face side of the cylindrical supporting housing and an assigned bearing mounting. The moveable mounting of the blocking element in the supporting housing and the linear mounting of the supporting housing the guiding rods can be very simple to construct.

In one embodiment according to the present invention, a first contact contour interacting with the free end of the driver arm is formed at the blocking element, and is formed substantially as a rectangular tooth protruding out of a straight base contour of the blocking element toward the free end of the driver arm. In a further embodiment of the invention, a second contact contour interacting with the first contact contour of the blocking element is also formed on the free end of the driver arm, and is substantially formed as a rectangular tooth protruding out of a straight base contour toward the blocking element.

The width of the two teeth corresponds substantially to the shift path of the gear shift shaft. Whereas with selector motion starting from the neutral shift gate, the face sides of the two teeth are on top of each other so that the blocking element is taken along during the selector motion, during the shifting motion the two teeth are moved in opposing directions by a tooth width such that the blocking element can jump back into the starting position thereof, wherein both teeth then lie against each other with the lateral surfaces thereof pointing toward each other, which will be explained in more detail.

It is further preferred that the recess of the supporting housing for the blocking element has an axial width such that after concluding a selector procedure with the teeth of the blocking element and the driver arm submerged in the recess, a gear can be engaged by axially moving of the gear shift shaft which also axially moves the tooth of the driver arm.

According to another constructive variant embodiment of the invention, the blocking element is again disposed mounted in a recess of a support housing and can be moved between the starting position thereof and the blocking position thereof. Here however, the support housing is disposed rotatably about a pivot axis aligned offset and at right angles to the longitudinal axis of the gear shift shaft such that, during a shifting motion, the arc track traversed by the support housing runs substantially tangential to the linear track traversed by the free end of the driver arm. Accordingly, the linear motion of the support housing according to the first example embodiment is replaced here by a pivot motion about the pivot axis.

The support housing with this embodiment variant has the shape of a cylinder having a longitudinal axis parallel to the pivot axis and having an axial recess for movably accommodating the substantially cylindrical blocking element, wherein the return spring arrangement is disposed between the blocking element and the bottom of the recess. The support housing is disposed at a pivot arm that is mounted at pivot bolt fastened to the surrounding structure, and rotatable coaxially to the pivot axis. The pivot arm is centered toward a central position by a leg spring coaxial with respect to the pivot bolts, supported on one side in the surrounding structure and on the other side at the pivot arm.

In this example embodiment too, a first contact contour interacting with the free end of the driver arm is formed at the blocking element, and is formed as a cylindrical peg projecting from the outer face side of the cylindrical blocking element toward the free end of the driver arm. A second contact contour interacting with the first contact contour is formed on the free end of the driver arm itself, and is formed as a rectangular tooth protruding out of a straight base contour toward the blocking element, wherein the width of the tooth and the diameter of the peg correspond substantially to the shift path of the gear shift shaft from the neutral position into a gear position.

BRIEF DESCRIPTION OF THE DRAWINGS

The invention is described in the following in more detail based on the attached drawings of a few embodiments. Shown are.

DETAILED DESCRIPTION OF THE PREFERRED EMBODIMENTS

Figure 1:
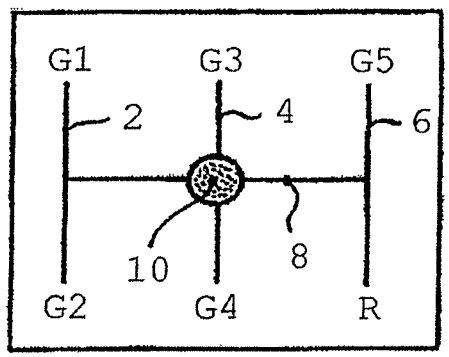
FIGS. 1 to 3 several shifting patterns of multi-stage manual transmissions, FIG. 4 a schematic perspective depiction of a shift safety device having a blocking element movable linearly with a shift motion, FIG. 5 a partial side view of the arrangement according to FIG. 4, FIGS. 6 to 13 different operating positions of the shift safety device according to the FIGS. 4 to 5, FIG. 14 a schematic perspective depiction of a shift safety device having a blocking element rotatable with a shift motion, and FIG. 15 a partial side view of the arrangement according to FIG. 14.
Figure 2:
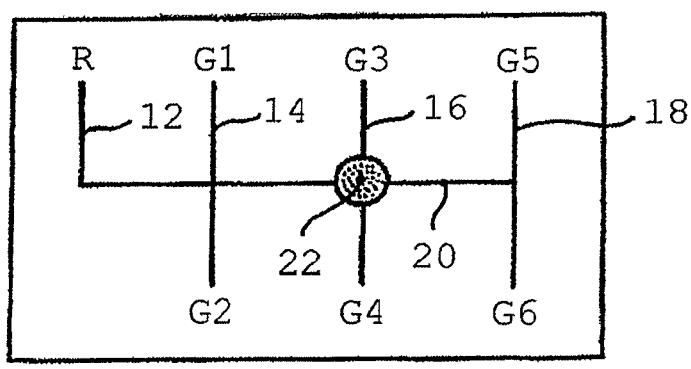
Figure 3:
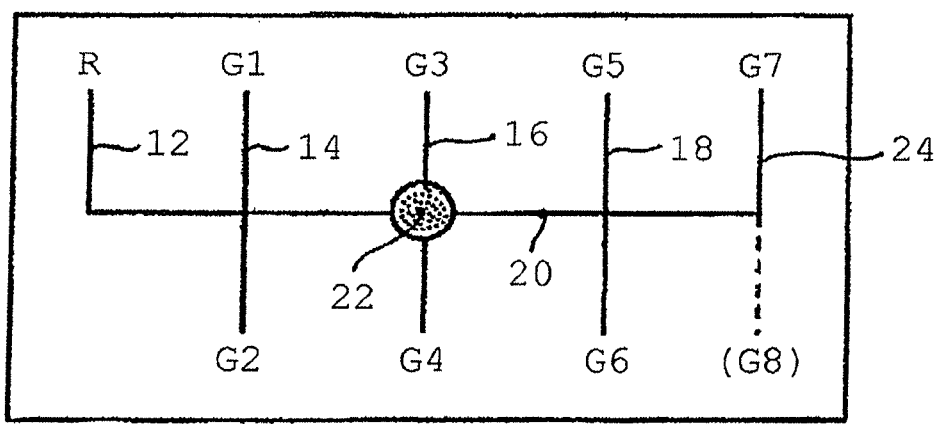

As already explained further above, the FIGS. 1 to 3 show various shift patterns, wherein the present invention is based on the shift pattern according to FIG. 3. This shift pattern comprises a central, neutral shift gate 16 for the gears G3 and G4, in which the manual shift lever of a driver's transmission shift and selector device is centered in a known manner by spring means, and additionally an adjacent first shift gate 14 for the gears G1 and G2, and on the other side an adjacent shift gate 18 for the gears G5 and G6. The shift pattern further comprises a special shift gate 12 for the reverse gear R, which is delimited by the shift gate 14 by a selector or shift block, already described further above, and a next outer shift gate 24, with respect to the shift gate 18, for the gear G7, and if applicable a gear G8. The shift gate 18 is delimited with respect to the shift gate 24 by a shift safety device described in the following.

Figure 4:
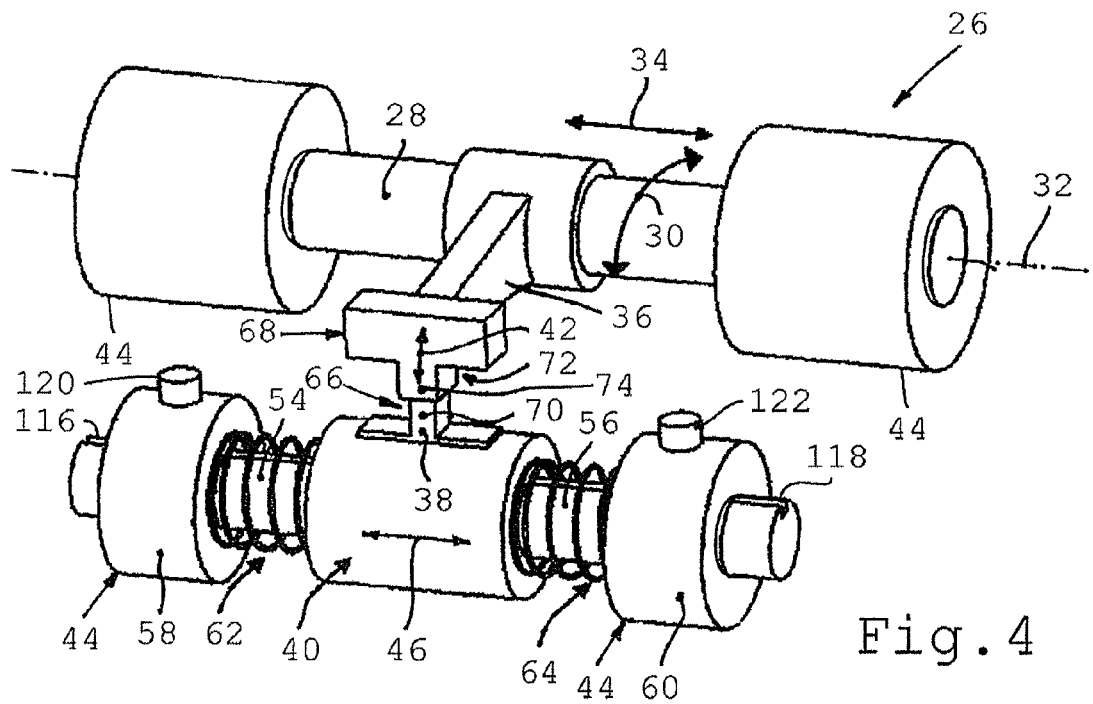

The shift safety device 26 shown in FIG. 4 comprises a gear shift shaft 28, which can rotate in the direction of the arrow 30 about the longitudinal axis 32 of the gear shift shaft and is axially movable in the direction of the arrow 34. For this purpose, the gear shift shaft 28 is mounted in a surrounding structure 44. The rotational motion according to the arrow 30 is assigned to a selector motion, that is, the shift gates are thusly selected, whereas the motion according to the arrow 34 corresponds to a shift motion with which the gears are engaged or disengaged.

A driver arm 36 that interacts with a blocking element 38 is disposed at the gear shift shaft 28. During a selector motion, the radial outer free end 68 of the driver arm 36 describes an arc track about the longitudinal axis 32 of gear shift shaft, and with a shifting motion describes a linear track parallel to the longitudinal axis 32 of the gear shift shaft. As shown particularly in FIG. 5, the blocking element 38 is mounted in a supporting housing 40 and is movable in the direction of the arrow 42 between a starting position driven out of the supporting housing 40 and a blocking position driven into the supporting housing 40. The supporting housing 40 for its part is mounted in a suitable surrounding structure 44 and is axially movable in the direction of the arrow 46.

The supporting housing 40 has approximately the shape of a cylinder having a longitudinal axis parallel to the gear shift shaft 28. The supporting housing has a radial recess 48, the shape of which is matched to the substantially plate-shaped blocking element 38. A return spring arrangement 52, formed by two compression springs 50, is placed between the blocking element 38 and the bottom of the recess 48.

Guide rods 54 and 56 are disposed at the face sides of the cylindrical supporting housing 40, and are moveably mounted in a respectively assigned bearing mounting 58 or 60, integrated in the surrounding structure 44. Compression springs 62 and 64, forming centering spring means and centering the receiving housing 40 into a central position using the spring force thereof, are disposed between the two face sides of the supporting housing 40 and the bearing mountings 58, 60 assigned thereto.

The guide rods 54 and 56 each have a longitudinal groove 116, 118 into which an assigned pin 120, 122 that is received in the bearing mountings 58, 60, projects with little play, so that the guide rods 54, 56 and thus also the supporting housing 40 are disposed longitudinally movable but unable to rotate.

A tooth-shaped contact contour 66 is formed at the blocking element 38, and is formed substantially as a rectangular tooth 70 projecting out of the straight base contour of the blocking element 38 toward the free end 68 of the driver arm 36. A second contact contour 72 interacting with the first contact contour 66 is formed at the free end 68 of the driver arm 36, and in a similar manner is formed substantially as a rectangular tooth 74 projecting out of the straight base contour toward the blocking element 38. The width of the teeth 70, 74 corresponds substantially to the shift path of the gear shift shaft 28 during shifting of a gear, as will be explained. It can be recognized that the tooth 74 of the driver arm 36 can be axially wider than the tooth 70 of the blocking elements 38. The free end 68 the driver arm 36, in addition to the tooth 74, has two legs 112, 114 pointing in opposing axial directions such that these legs 112, 114 and the tooth 74 together, viewed on the radial end 68 of the driver arm 36, appear to have approximately a T-shape.

Figure 5:
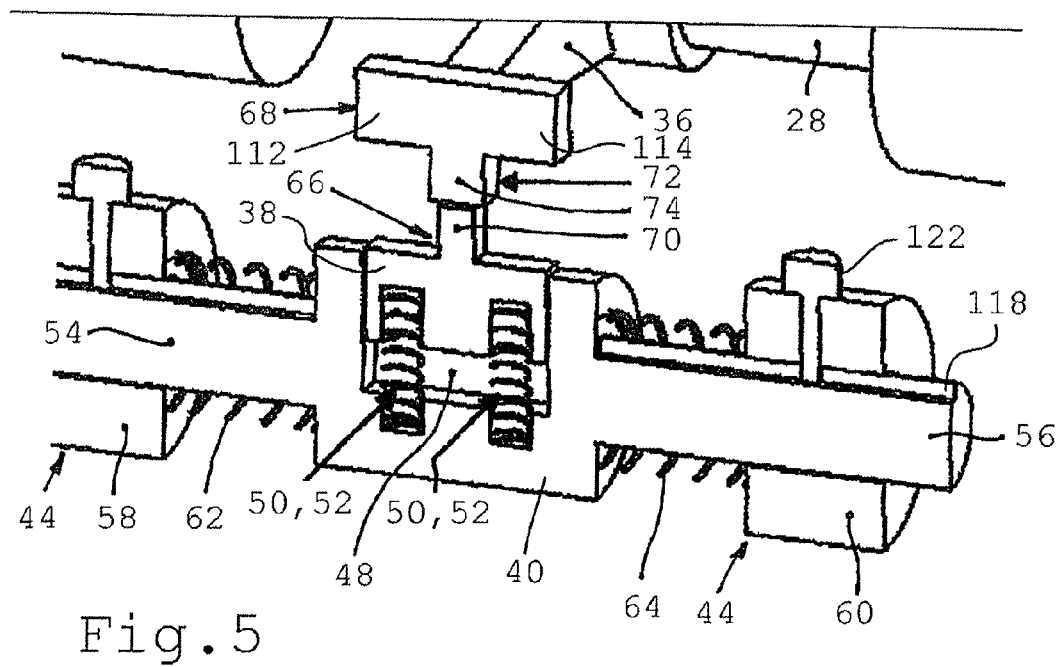
Figure 6:
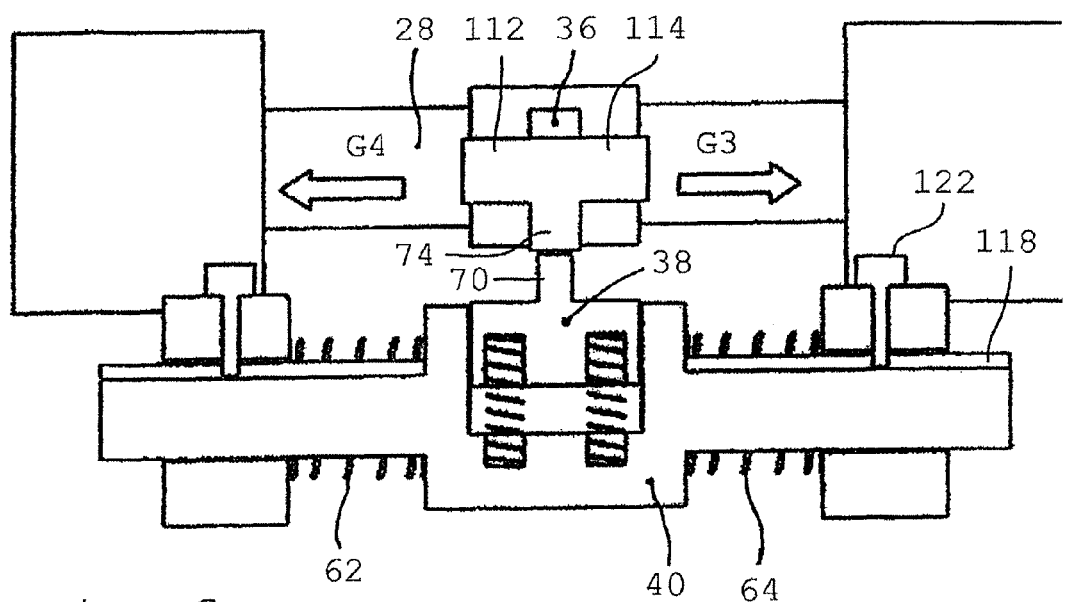

The function of the shift safety device 26 according to the FIGS. 4 and 5 is explained in more detail based on the FIGS. 6 to 13:

With the starting position shown in FIG. 6, the gear shift shaft 28 is located in a neutral position corresponding to the neutral position of the manual shift lever 22 (FIG. 3). As explained already, in this neutral position the gears G3 and G4 can be engaged by an axial movement of the gear shift shaft 28 towards the right or left in FIG. 6. The blocking element 38 is located in the starting position thereof, driven out of the supporting housing 40, and the supporting housing 40 itself is placed in a central position centered by the compression springs 62, 64.

Figure 7:
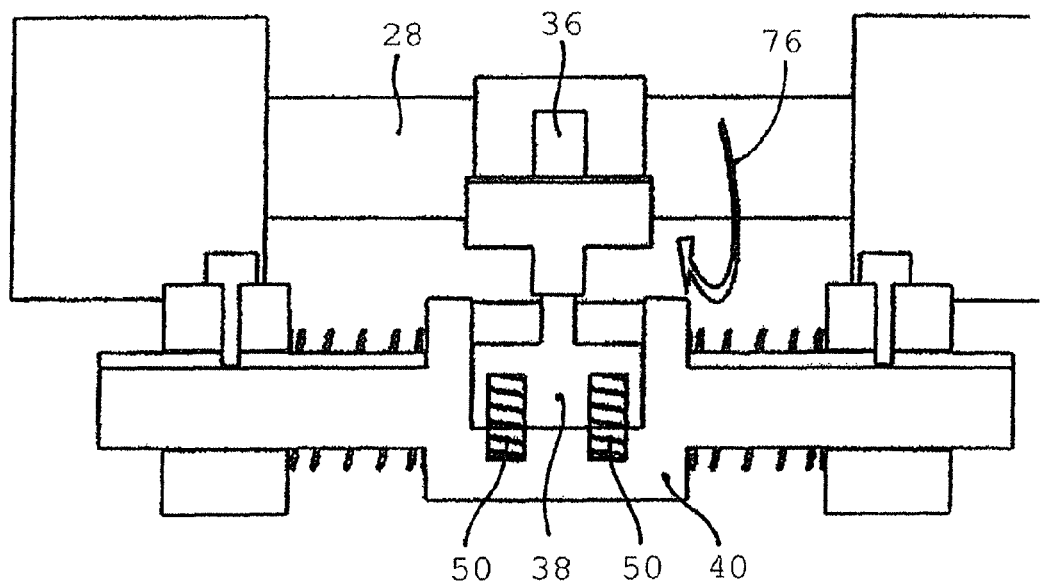

In order to select the outer shift gate 18 next to the neutral shift gate 16, the gear shift shaft 28, as shown in FIG. 7, rotates corresponding to the arrow 76, wherein the blocking element 38 is moved using the teeth 70 and 74 standing on top of each other with their face sides, against the force of the compression springs 50, into the blocking position thereof, in which it rests on the bottom of the recess 48 of the supporting housing 40. In this manner, a further selector motion of the gear shift shaft 28 to the next outer shift gate 24 with respect to the shift gate 18 is blocked.

Figure 8:
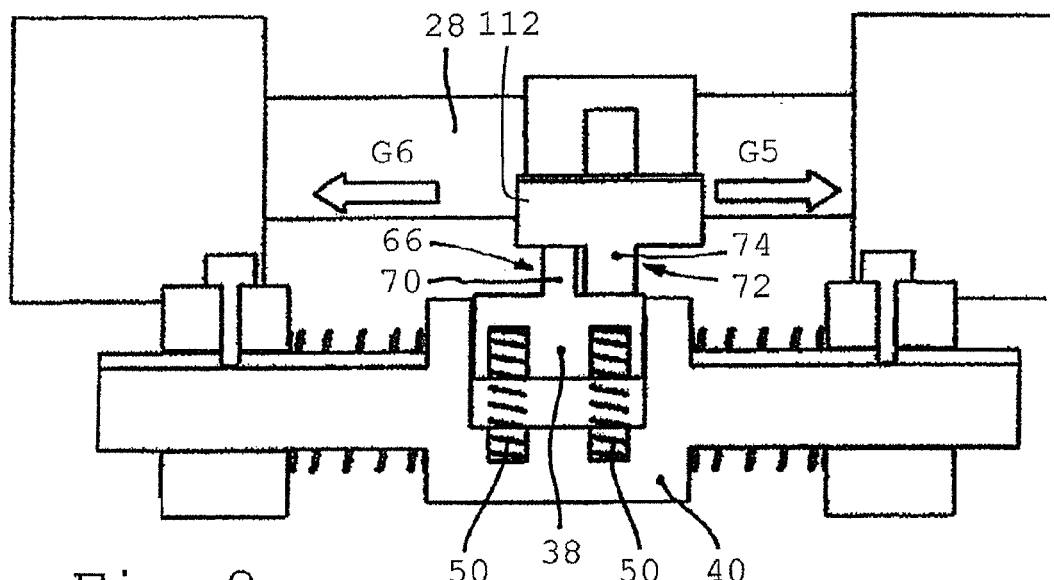
Figure 9:
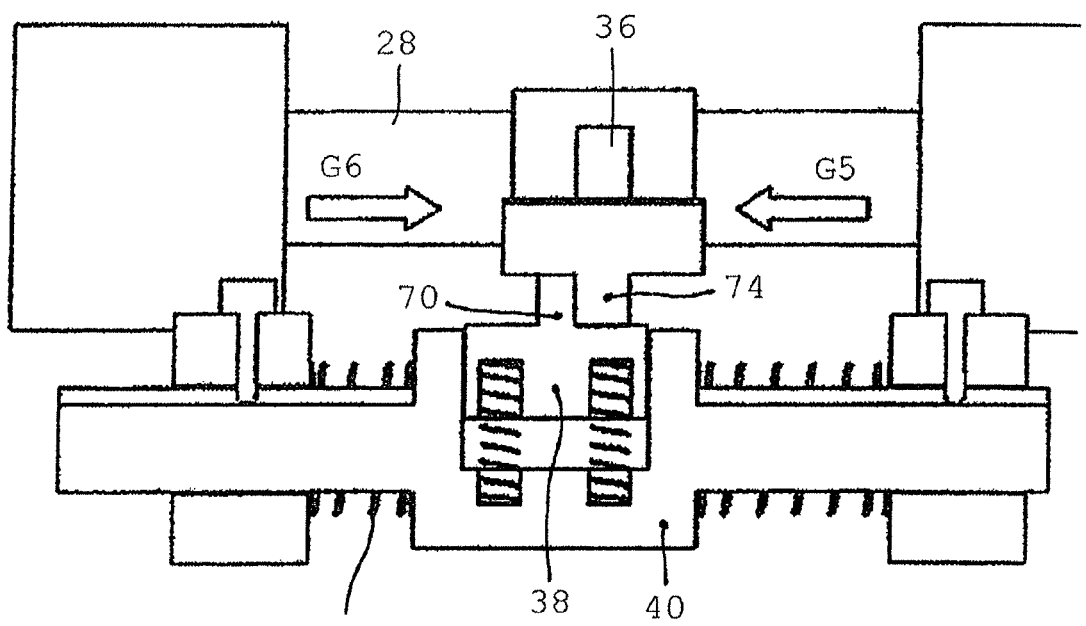

With shifting one of the gears G5 or G6 by an axial movement of the gear shift shaft 28, in the case of FIG. 8 shifting the gear G5, the second contact contour 72 formed at the free end 68 of the driver arm 36 is pushed laterally against the first contact contour 66 formed at the blocking element 38, whereby the teeth 70 and 74 are no longer in contact, so that the blocking element 38 is returned to the starting position thereof by the compression springs 50. The tooth 70 with the face side thereof rests against the straight base contour of the T-leg 112 of the driver arm 36.

During disengaging the gear G5 (FIG. 9) and engaging the gear G6, the blocking element 38 and the supporting housing 40 receiving the blocking element are taken along axially by the free end 68 of the driver arm 36, and are moved counter to the force of the compression spring 62, into an off-center position axially shifted with respect to the central position.

Figure 10:
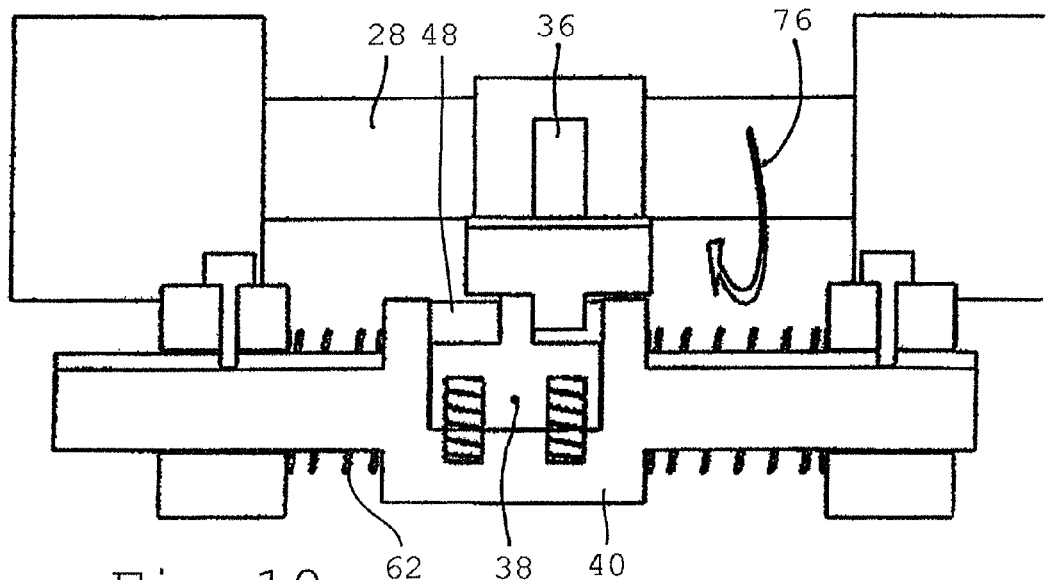
Figure 11:
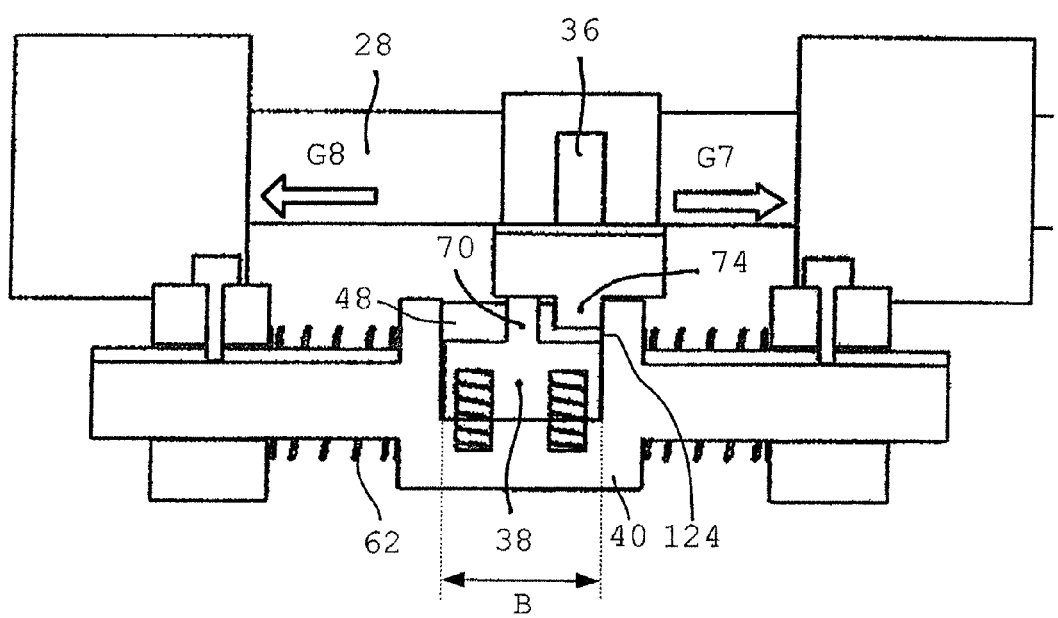

As the blocking element 38, after engaging one of the gears G5 or G6, is again located in the starting position thereof, now a further rotation of the gear shift shaft 28, according to the arrow 76 in FIG. 10, can select the outer shift gate 24 next to the shift gate 18, wherein the blocking element 38 is moved, out of the starting position thereof into the blocking position thereof, deep into the recess 48 of the supporting housing 40. It can be recognized that with this selector procedure, the tooth 74 of the driver arm 36 engages into the recess 48 of the supporting housing 40. Next, according to FIG. 11, by axially moving the gear shift shaft 28 toward the right, the gear G7 (and if needed the gear G8 by moving toward the left) can be engaged. The recess 48 of the supporting housing 40 has a sufficiently large width B so that the tooth 70 of the blocking elements 38 can be moved up to the axially opposite wall 124 of the recess 48 for engaging the gear G7.

Figure 12:
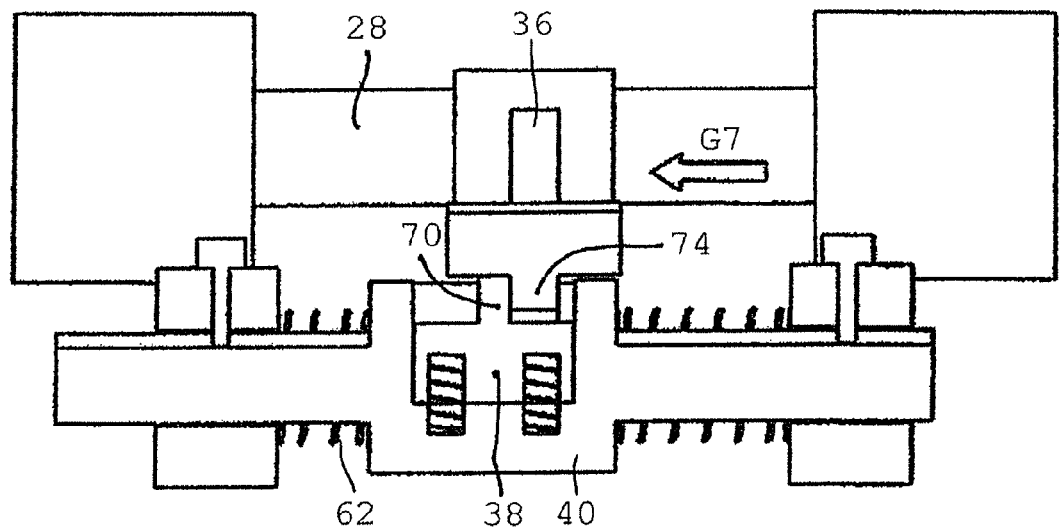
Figure 13:
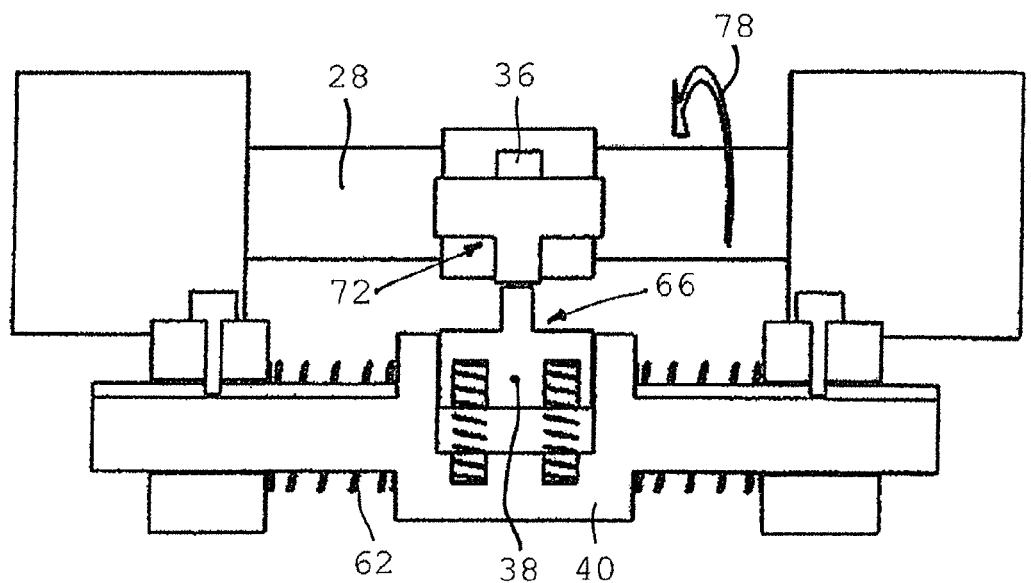

After disengaging the gear G7 by axially moving the gear shift shaft 28 toward the left, according to FIG. 12, the gear shift shaft 28 can be rotated by a rotation in the direction of the arrow 78 (FIG. 13) initially into a rotational position corresponding to the shift gate 18, in order to engage, for example one of the gears G5 or G6. In doing so, the free end 68 of the driver arm 36 and the blocking element 38 move initially upward into a position corresponding approximately to that of FIG. 8, which allows for engaging the gears G5, G6 but which also allows for reselecting the shift gate 24 (gears G7, G8) at any time.

With further rotation of the gearshift shaft 28 according to the arrow 78 (FIG. 13) into the rotational position corresponding to the neutral shift gate 16, the contact contours 66 or 72 are no longer engaged so that the supporting housing 40 is moved into the central position thereof by the loaded compression spring 62, and the system again takes on the starting position thereof, represented in FIG. 6.

Figure 14:
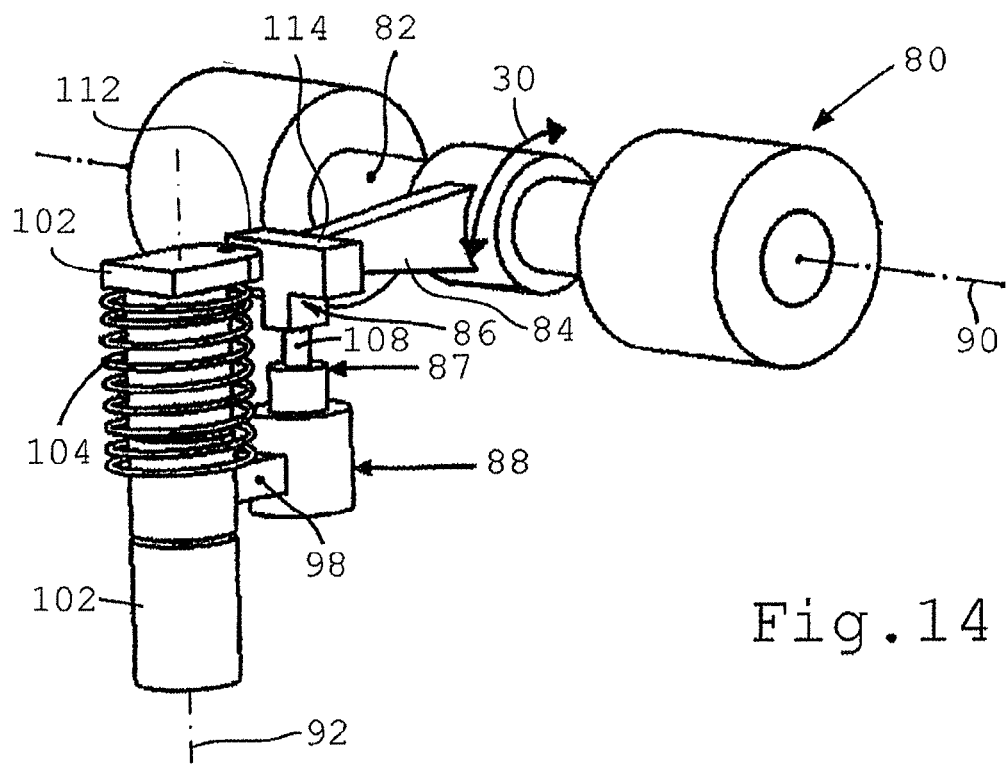
Figure 15:
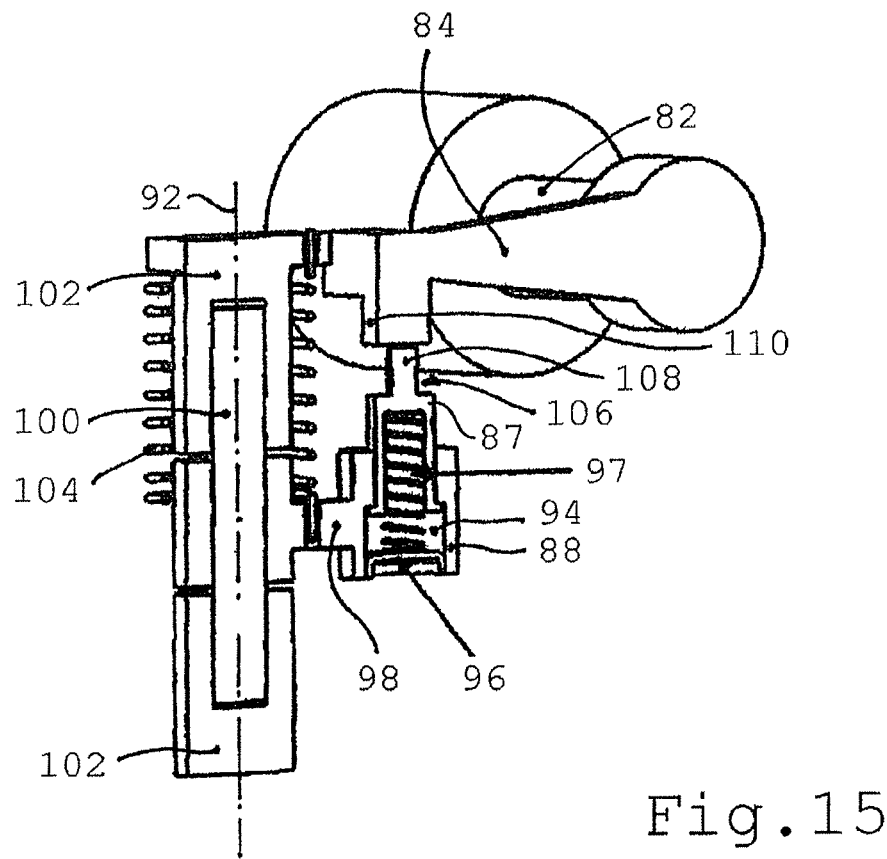

The FIGS. 14 and 15 show a shift safety device 80 similar to the shift safety device according to the FIGS. 4 to 13. The gear shift shaft 82 with the driver arm 84 disposed thereon and the contact contour 86 formed at the free end of the driver arm 84 forming a T-shape in the radial top view correspond exactly to the arrangement described using the previous example embodiment. Accordingly, a tooth 110 and two T-legs 112, 114, aligned parallel to the gear shift shaft longitudinal axis 90, are formed at the free end of the driver arm 84, the outer surfaces of which, facing a blocking element 87, form the contact contour 86.

A fundamental difference to the first example embodiment however is the fact that the blocking element 87 and the supporting housing 88 receiving the blocking element are not linearly movable, but rather are disposed rotatably about a pivot axis 92 aligned offset and at a right angle to the longitudinal axis 90 of the gear shift shaft 82. Here, the arc track traversed by the supporting housing 88 runs substantially tangential to the linear track, parallel to the longitudinal axis 90 of the gear shift shaft, traversed by the free end of the driver arm during the shifting motion of the gear shift shaft 82.

In the depicted example embodiment, the supporting housing 88 is shaped as a cylinder having a longitudinal axis parallel to the pivot axis 92. The housing receives, in an axial recess 94, the substantially cylindrical blocking element 87 that is movable between the starting position shown in the FIGS. 14 and 15, driven out of the supporting housing 88, against the force of a compression spring 97 disposed between the blocking element 87 and the bottom 96 of the supporting housing 88, into a blocking position driven into the supporting housing 88.

The supporting housing 88 is mounted using a pivot arm 98 rotatable on a pivot bolt 100 coaxially to the pivot axis 92. The pivot arm 98 is centered into a rotational central position by means of a leg spring 104 that is coaxial to the pivot bolt 100 and serves as a centering spring means, and is supported on one side in the surrounding structure 102 and on the other side at the pivot arm 98.

The contact contour 86 formed radially outward at the driver arm 84 interacts with a contact contour 106 formed at the blocking element 87. This contact contour 106 is formed substantially as a cylindrical peg 108 projecting out of an outer face side of the cylindrical blocking element 87 toward the free end of the driver arm 84, and has the function of the tooth 70 described in the prior example embodiment.

With a selector motion of the gear shift shaft 82, that is, with the rotation thereof, the blocking element 87 is moved between the starting position thereof and the blocking position thereof. During a shifting motion of the gear shift shaft 82, that is, with an axial movement of the gear shift shaft 82, the blocking element 87 pivots, with contact contours 86, 106 moving laterally offset from each other, counter to the force of the pivot spring 104 about the pivot axis 92, or is moved back into the rotationally central position thereof with the return of the manual shift lever.

It is pointed out here that a shift safety device of the type according to the invention can fundamentally also be provided for selection procedures at a next inner shift gate, wherein then with selection of a respective next inner shift gate, the blocking element is taken along into a blocking position and is released again upon engaging a gear.

REFERENCE CHARACTERS 2 shift gate
4 shift gate
6 shift gate
8 selector gate
10 manual shift lever
12 shift gate
14 shift gate
16 shift gate
18 shift gate
20 selector gate
22 manual shift lever
24 shift gate
26 shift safety device
28 gear shift shaft
30 arrow, selection motion
32 longitudinal axis of the gear shift shaft 28
34 arrow, shift motion
36 driver arm
38 blocking element
40 supporting housing
42 arrow, direction of motion of the blocking element
44 surrounding structure
46 arrow, direction of motion of the retaining housing
48 recess
50 compression springs
52 return spring arrangement
54 guide bar
56 guide bar 58 bearing mounting
60 bearing mounting
62 compression spring
64 compression spring
66 contact contour
68 free end of the driver arm
70 tooth
72 contact contour
74 tooth
76 arrow, direction of rotation of the gear shift shaft
78 arrow, direction of rotation of the gear shift shaft
80 shift safety device
82 gear shift shaft
84 driver arm
86 contact contour
87 blocking element
88 supporting housing
90 longitudinal axis of the gear shift shaft 82
92 pivot axis
94 recess
96 bottom
97 compression spring
98 pivot arm
100 pivot bolts
102 surrounding structure
104 leg spring
106 contact contour
108 peg
110 tooth
112 axial leg at the end of the driver arm
114 axial leg at the end of the driver arm
116 longitudinal groove in the guide bar
118 longitudinal groove in the guide bar
120 pin
122 pin
124 wall of the recess in the supporting housing
B axial width of the recess in the supporting housing
G1-G8 forward gears
R reverse gear

The invention claimed is:

1. A shift safety device (26) for a motor vehicle manual transmission comprising a gear shift shaft (28) that defines a longitudinal axis and is rotatable during selector motion for selecting shift gates and being axially movable during shifting motion for shifting gear steps, the shift safety device comprising:
a blocking element (38) has a contact contour (66), the blocking element which, during the selector motion of the gear shift shaft towards an adjacent shift gate, is moved by the gear shift shaft (28) using the contact contour (66) thereof against a force of a return spring out of a starting position into a blocked position, the blocking element in the blocked position blocks further selector motion of the gear shift shaft (28), and, during a subsequent shifting motion of the gear shift shaft (28), the blocking element is released and then returned by the return spring into the starting position thereof for permitting the further selector motion,
a radially projecting driver arm (36) being disposed on the gear shift shaft (28), a free end (68) of the radially projecting driver arm (36) has a contact contour (72) that interacts with the contact contour (66) of the blocking element (38), the blocking element (38) is movably arranged within a supporting housing which is movably disposed in a surrounding structure (44) of the gear shift shaft (28) that is fixed to a further housing such that the blocking element is moved tangentially to an arcuate track that is traversed, during the selector motion, by the free end (68) of the radially projecting driver arm (36) to move the blocking element between the starting position thereof and the blocking position thereof, the blocking element in the starting position thereof protrudes from the supporting housing, the blocking element (38) being movably supported in a direction of a linear track traversed by the free end (68) of the radially projecting driver arm (36) during the shifting motion, parallel to the longitudinal axis (32) of the gear shift shaft (28), and
the blocking element (38) being pretensioned, toward the starting position thereof, by the return spring and along the linear track, toward a center position, by centering spring means (62, 64).

2. The shift safety device according to claim 1, wherein the blocking element is movable between the starting position, in which the contact contour of the blocking element extends from the supporting housing, and the blocking position, in which the blocking element is received within the supporting housing, and the supporting housing (40) is displaceably mounted in the surrounding structure (44).

3. The shift safety device according to claim 1, wherein the contact contour (66) of the blocking element (38) is a first contact contour (66), which interacts with the free end (68) of the radially projecting driver arm (36), and is formed as a rectangular tooth (70) which protrudes from a base contour of the blocking element (38) toward the free end (68) of the radially projecting driver arm (36).

4. The shift safety device according to claim 3, wherein the contact contour (72) of the free end (68) of the radially projecting driver arm (36) is a second contact contour (72), which interacts with the first contact contour (66) of the blocking element (38), and is formed as a second rectangular tooth (74) which protrudes from a base contour of the free end of the radially projecting driver arm (36) toward the blocking element (38), a width of at least one of the rectangular tooth on the blocking element and the second rectangular tooth on the radially projecting driver arm corresponds substantially to a shift path of the gear shift shaft (28).

5. The shift safety device (80) according to claim 1, wherein the blocking element (87) is disposed so as to be movably mounted in a supporting housing (88) between the starting position and the blocking position, and the supporting housing (88) is rotatably disposed about a pivot axis (92) aligned offset and at a right angle to the longitudinal axis (90) of the gear shift shaft (82) such that the arcuate track, which is traversed thereby, runs substantially tangential to the linear track traversed by the free end of the radially projecting driver arm (84) during a shifting motion.

6. The shift safety device according to claim 5, wherein the supporting housing (88) is cylindrical having a longitudinal axis which is parallel to the pivot axis (92), the supporting housing (88) has an axial recess (94) for movably accommodating the cylindrical blocking element (87), the return spring is disposed between the blocking element (87) and a bottom (96) of the axial recess (94), the supporting housing (88) is disposed adjacent an end of a pivot arm (98), which is mounted at a pivot bolt (100) disposed in a surrounding structure (102) and is coaxial to the pivot axis (92), and the pivot arm (98) is centered in a rotational central position by a leg spring (104) that is coaxial to the pivot bolt (100) and supported, on one side, by a surrounding structure (102) and, on an other side, at the pivot arm (98).

7. The shift safety device according to claim 5, wherein the contact contour of the blocking element is a first contact contour (106) that interacts with the free end of the radially projecting driver arm (84), and the first contact contour is formed on the blocking element (87) as a cylindrical peg (108) which projects from of an outer face of the blocking element (87) toward the radially projecting driver arm (84).

8. The shift safety device according to claim 7, wherein the contact contour of the free end of the radially projecting driver arm is a second contact contour (86), which interacts with the first contact contour (106) of the blocking element (87), the second contact contour is formed on a surface of the radially projecting driver arm (84) as a rectangular tooth (110) which protrudes from a base contour of the free end of the radially projecting driver arm toward the blocking element (87), a width of the tooth (110) and a diameter of the cylindrical peg (108) correspond substantially to a shift path of the gear shift shaft (82) from a neutral position into a gear shift position.

9. A shift safety device (26) for a motor vehicle manual transmission comprising a gear shift shaft (28) that is rotatable for selecting shift gates and being axially movable for shifting gear steps, the shift safety device comprising:
  a blocking element (38) has a contact contour (66), and the blocking element, which during a selector motion towards an adjacent shift gate, is moved by the gear shift shaft (28) using the contact contour (66) thereof against a force of a return spring out of a starting position into a blocked position, the blocking element in the blocked position blocks further selector motion of the gear shift shaft (28), and, during a subsequent shifting motion of the gear shift shaft (28), the blocking element is released and returned by the return spring into the starting position thereof for permitting further selector motion;
  a radially projecting driver arm (36) is disposed on the gear shift shaft (28), a free end (68) of the radially projecting driver arm (36) has a contact contour (72) that interacts with the contact contour (66) of the blocking element (38), the blocking element (38) is movably disposed in a surrounding structure (44) of the gear shift shaft (28) that is fixed to a housing and the blocking element is moved in a direction substantially tangential to an arcuate track that is traversed, during the selector motion, by the free end (68) of the radially projecting driver arm (36) to move the blocking element between the starting position thereof and the blocking position thereof, the blocking element (38) being substantially movably supported in a direction of a linear track traversed by the free end (68) of the radially projecting driver arm (36) during the shifting motion, parallel to a longitudinal axis (32) as defined by the gear shift shaft (28);
  the blocking element (38) is pretensioned, toward the starting position thereof, by the return spring and is pretensioned along the linear track, toward a center position, by centering spring means (62, 64);
  the blocking element (38) is accommodated within a supporting housing (40), the blocking element is movable between the starting position thereof and the blocking position thereof, and the supporting housing (40) is displaceably mounted in the surrounding structure (44); and
  the supporting housing (40) is cylindrical with a longitudinal axis which is parallel to the gear shift shaft (28), the supporting housing (40) has a radial recess (48) for movably accommodating the blocking element (38) which is shaped as a plate, the return spring is disposed between the blocking element (38) and a bottom of the radial recess (48), the supporting housing (40) has a first axial side face which supports a first guiding rod (54) which is movably disposed relative to a first bearing mounting (58), and the supporting housing (40) has a second axial side face which supports a second guiding rod (56) which is movably disposed relative to a second bearing mounting (60), and the centering spring means comprises first and second compression springs, which bias the supporting housing (40) toward the center position, the first and the second compression springs are disposed between a respective one of the first and the second axial side faces of the supporting housing (40) and a respective one of the first and the second bearing mountings (58, 60).

10. The shift safety device according to claim 9, wherein the radial recess (48) of the supporting housing (40) for the blocking element (38) has an axial width (B) such that after concluding a selector procedure with associated teeth (70, 74) of the blocking element (38) and the radially projecting driver arm (36), a gear (G7) is engagable by axial movement (34) of the gear shift shaft (28).

11. A shift safety device (26) for a motor vehicle manual transmission comprising a gear shift shaft (28) that is rotatable during a selector motion to select shift gates and is axially movable during a shifting motion to shift gear steps, the shift safety device comprising:
  a blocking element (38) has a contact contour (66), the blocking element which, during the selector motion of the gear shift shaft towards an adjacent shift gate, is biased by the gear shift shaft (28) using the contact contour (66) thereof against a force of a return spring (50, 52) out of a starting position into a blocked position, the blocking element in the blocked position blocks a further selector motion of the gear shift shaft (28) and, during a subsequent shifting motion of the gear shift shaft (28), the blocking element is released and then returned by the return spring (50, 52) into the starting position thereof for permitting the further selector motion, a radially projecting driver arm (36) is fixed to the gear shift shaft (28), a free end (68) of the radially projecting driver arm (36) has a contact contour (72) that interacts with the contact contour of the blocking element (38),
  the blocking element (38) being movably arranged within a supporting housing that is movably disposed in a surrounding structure (44) of the gear shift shaft (28) such that the blocking element is movable tangentially to an arcuate track that is traversed during the selector motion by the free end (68) of the radially projecting driver arm (36) between the starting position thereof and the blocking position thereof, the blocking element in the starting position thereof extends from the supporting housing,
  the blocking element (38) being substantially movably supported in a direction of a linear track traversed by the free end (68) of the radially projecting driver arm (36) during the shifting motion of the gear shift shaft, parallel to a longitudinal axis (32) of the gear shift shaft (28), and the blocking element (38) being pretensioned, toward the starting position thereof, by the return spring and along the linear track, toward a center position, by centering springs (62, 64).

* * * * *